Figure 1:
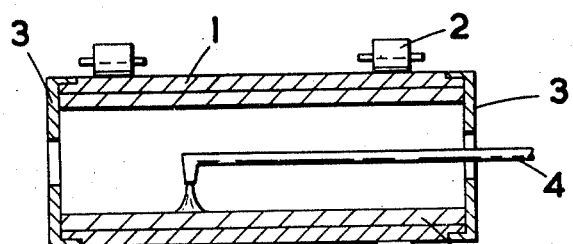

Sept. 22, 1964 W. K. SCHMIDT 3,150,219
PROCESS OF MAKING PLASTIC PIPES
Filed June 27, 1960

William K. Schmidt
Inventor
By Cushman, Darby & Cushman
Attorneys

United States Patent Office 3,150,219
Patented Sept. 22, 1964

3,150,219
PROCESS OF MAKING PLASTIC PIPES
William Karl Schmidt, 6340 Cambie St., Vancouver 15,
British Columbia, Canada
Filed June 27, 1960, Ser. No. 38,934
Claims priority, application Canada, Aug. 25, 1959,
781,252, Patent 611,629
3 Claims. (Cl. 264—258)

This invention relates to a method of manufacturing hollow cylindrical articles of synthetic resin reinforced by fibrous material. The invention is especially concerned with the manufacture of seamless pipes of synthetic resin having a glass fibre reinforcement.

Centrifugal casting of metals is well known. Proposals have been made to produce pipes of synthetic resin by use of centrifugal casting techniques but difficulty has been encountered in devising a method which would enable the introduction, in a commercially feasible manner, of a fibrous reinforcing material into the resin in such a manner as to ensure even distribution of the fibrous reinforcing material throughout the resin and to produce an article of which both the inner and outer surfaces are free from gross discontinuities. For example, U.S. Patent No. 2,773,287 discloses a method of producing plastic pipes which comprises introducing a mat of glass fibre into a rotatable hollow mould and successively depositing on the mat, while the mould is rotating, a thermo-setting resin and a dense granular sand-like material. The purpose of adding the sand-like material is to compact the glass fibre mat. Such a method involves the preliminary fabrication of a glass mat and yields a pipe which has a rough inner wall.

It is an object of this invention to provide a method of manufacturing hollow cylindrical articles of synthetic resin reinforced by a fibrous material in which a mat of the fibrous material can be formed in situ within a cylindrical mass of fluid resin.

It is a further object of the invention to provide such a method which is capable of producing a hollow article the inner wall of which is free from gross discontinuities.

These and other objects, which will be apparent from the following description, are fulfilled by providing a method of manufacturing pipe composed of synthetic resin reinforced by a fibrous material, comprising introducing curable synthetic resin in fluid state into a rotating mould having a cylindrical inner wall, the speed of rotation of the mould being such that the resin is forced against the inner wall of the mould to form a hollow cylinder of fluid resin, and applying fibrous reinforcing material which has a specific gravity higher than that of the resin to the inner surface of said hollow cylinder of fluid resin in an amount sufficient to form a fibrous reinforcement, and curing the resin while continuing rotation of the mould.

The fibrous reinforcing material, which is preferably glass fibre, may be in the form of a continuous filament or of staple fibre. When it is in the form of continuous filament, it is preferably introduced into the mould by means of a movable feed member adapted for longitudinal movement inside the mould. As soon as the continuous filament is brought into contact with the hollow cylinder of fluid resin it adheres thereto. Since the hollow cylinder of resin is rotating, a pull is exerted on the filament which causes more of it to issue from the feed member. By movement of the feed member longitudinally within the mould, it can be arranged that the filament is continuously taken up along the whole inner surface of the resin. Because the hollow cylinder of fluid resin is rotating, the filament is drawn beneath the surface of the resin into the interior thereof. This is facilitated if the material of which the filament consists has a higher specific gravity than the resin. By repeated longitudinal movement of the feed member, backwards and forwards within the mould, a number of layers of the continuous filament may be laid down to produce a reinforcing mat of braided structure within the hollow cylinder of fluid resin.

The pull exerted on the continuous filament due to rotation of the mould is normally sufficient to cause it to issue smoothly from the feed member. If it is not, or if it is desired to speed up the operation, issuance of the continuous filament from the feed member can be assisted by supplying air under pressure to the interior of the feed member, the resulting stream of air through the feed member tending to carry the filament with it. For this purpose the feed member is given a tubular form.

When applying to the hollow cylinder of fluid resin a fibrous reinforcing material consisting of staple fibres, the rotation of the mould cannot be used to cause these fibres to issue from an applicator. It is therefore necessary to provide some means of forcing the staple fibres against the inner wall of the hollow cylinder of resin, for example, by introducing them through a tubular feed member by means of air pressure. Whereas the use of continuous filament reinforcing material results in the production of a reinforcement having a braided structure, the use of staple fibres results in a reinforcement having a felted structure.

It is possible to apply both continuous filament and staple fibres, simultaneously or successively, so that the finished article is reinforced by the combination of a braided reinforcement and a felted reinforcement.

The resin employed may be curable under the action of heat or in the cold by catalytic action. If a thermo-setting resin is employed, it may be cured by applying heat to the outside of the mould or by passing hot air through the mould or by a combination of these measures. If the resin is curable in the cold by catalytic action it is necessary to arrange that the formation of a hollow cylinder of the resin and the subsequent application of reinforcing fibrous material can be carried out before the resin has cured. This offers little difficulty since there are now commercially available many formulations of resin which, by appropriate adjustment of the proportions of their constituents, can be arranged to set in the cold within a pre-determined time. Compositions of polyester resins are available which are especially suitable for this purpose. Normally the catalyst and accelerator are included in the resin before it is introduced into the mould, but it is evident that should it be desirable, it is possible to withhold the catalyst or accelerator until after the fibrous reinforcing material has been deposited in the resin and then to introduce it into the mould by means of a spray head or the like. It is also feasible in some circumstances to use fibrous reinforcing material which has been coated with the catalyst or accelerator.

By the method of the invention, it is possible to produce quickly, and relatively cheaply, reinforced hollow articles having smooth internal and external walls. An important advantage of the method is the facility with which it may be used for mass production of pipes of reinforced synthetic resin. All the operations involved can be carried out quickly, if desired automatically, the amount of manual labour involved being reduced to the minimum. In order to get the highest possible output it is of course important to arrange that the time required for curing the resin is as low as possible either by providing efficient heating apparatus when thermo-setting resin is used or by properly selecting the proportions of catalyst and accelerator in the resin mix when a cold-setting resin is used.

Figure 2:
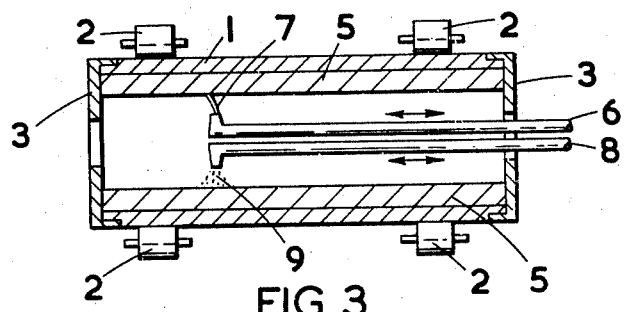
Figure 3:
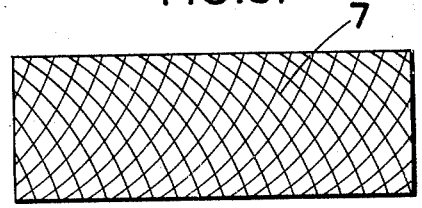
Figure 4:
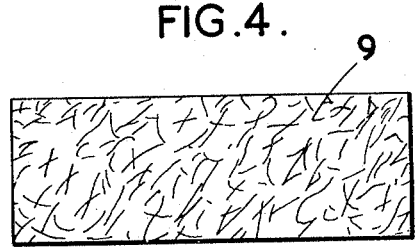

The invention will be described by way of illustration without limitation with reference to the accompanying drawings in which:

FIG. 1 shows a first stage in the production of a pipe formed of resin and reinforced by fibrous reinforcing material, FIG. 2 shows the second stage, and FIGS. 3 and 4 illustrate two kinds of reinforcements.

FIG. 1 shows a mould 1 having a cylindrical inner wall and mounted for rotation between guide rolls 2. The system for driving the guide rolls 2 is not illustrated since it can be of any conventional type; in fact, the guide rolls 2 may be replaced by any other suitable arrangement for supporting and driving a rotatable mould.

The mould 1 is provided at its end with removable annular flanges 3 so that it is possible to form a hollow cylinder of liquid resin 5 upon the inner wall of the mould when the latter is in rotation. FIG. 1 shows the use of an applicator pipe 4 for introducing liquid resin 5 into the mould. Conveniently, the applicator pipe 4 is arranged for movement along the length of the mould so that the layer of resin 5 may be speedily laid down. It is, however, not essential to use a movable applicator for introducing the resin because even if the resin is introduced at one place only against the inner wall of the mould 1 it is subsequently distributed along the length of the mould as a result of centrifugal force.

FIG. 2 shows the manner in which the reinforcing fibrous material is introduced into the resin 5. A feed pipe 6 arranged for reciprocatory movement along the length of the mould dispenses fibrous material, for example glass fibre, in the form of a continuous filament 7. Before the feed pipe 6 is inserted into the mould 1, a sufficient length of the filament 7 is pulled out from the end of the pipe to ensure that the filament comes into contact with the resin 5 when the feed pipe 6 is inserted into the mould. The filament 7 adheres to the resin 5 and, since the resin is rotating with the mould 1, is thereby pulled out from the feed pipe 6. By moving the feed pipe 6 along the mould a helix of the filament 7 is laid down upon the resin 5, the pitch of the relix depending on the speed of movement of the feed pipe 6. This helix does not remain upon the surface of the resin 5 but penetrates into the mass of the resin, this penetration being facilitated because the specific gravity of the material of which the filament 7 is composed is greater than that of the resin 5. By passing the feed pipe 6 backwards and forwards for a number of times within the mould 1, a braid of the filament 7 is laid down within the resin 5. FIG. 3 illustrates schematically the kind of braid which can be produced within the interior of the resin by effecting two passes of the feed pipe 6, one pass in each direction. In practice, of course, the number of passes may greatly exceed two depending on the wall thickness of the pipe being produced and the degree of strength required. The issuance of the continuous filament 7 from the feed pipe 6 may be facilitated if desired by supplying air under pressure to the interior of the feed pipe 6.

FIG. 2 also shows the use of a feed pipe 8 for introducing staple fibres, for example staple glass fibres, into the resin 5. In this case, the rotation of the mould 1 cannot assist in drawing the staple fibres from the pipe 8 so compressed air is necessarily supplied to the inside of the pipe 8 in order to eject the staple fibres 9 therefrom. The fibres 9 penetrate into the interior of the mass of resin 5 as does the continuous filament 7. The feed pipe 8 is movable along the length of the interior of the mould 1 in the same manner as the feed pipe 6. The application of the staple fibres 9 can be effected either by means of a single pass of the feed pipe 8 or by repeated passes. FIG. 4 illustrates schematically the type of reinforcement which is produced by applying only the staple fibres 9.

It is possible to supply the fibrous reinforcing material solely as continuous filament 7 or solely as staple fibres 9 or to apply it in both of these forms. In the latter case, the finished hollow article will be reinforced by a combination of a braid formed of continuous filament and a felt formed of staple fibres.

When the fibrous reinforcing material has been applied and rotation has been continued for a sufficient length of time to allow it to settle into the resin, the resin is cured, after which the finished pipe is withdrawn from the mould 1, the flanges 3 or one of them being removed for this purpose. If the resin is a thermo-setting resin, the curing can be effected by applying heat to the outside of the mould 1 or by passing a stream of hot air through the mould or by a combination of these two expedients. If the resin is one which sets in the cold under the action of a catalyst, rotation of the mould 1 is continued until setting has taken place. It is not difficult to procure resin mixes in which the proportion of catalyst and accelerator can be adjusted to control the setting time of the resin so that the resin can be introduced into the mould 1, and the fibrous reinforcing material applied to the resin, before curing of the resin has taken place. For example, resin mixes which have been successfully employed in the production of hollow articles by the method of the invention are polyester resins known as MR 28 and MR 30 (containing from 2 to 5% of cobalt naphthenate as accelerator and from 1 to 4% of cyclohexanone peroxide of catalyst), Vibrin F–1 (with 2% of a peroxide catalyst and no accelerator), and Vibrin F–117 (with from 2 to 4% of a peroxide catalyst and 2 to 4% of accelerator). The use of a cold setting polyester resin mix has, in general, been found to be most convenient.

I claim:

1. A method of manufacturing a reinforced hollow cylindrical article which comprises introducing curable synthetic resin in fluid state into a rotating mould having a totally cylindrical inner wall and mounted for rotation about a horizontal axis co-axial with the cylindrical axis of the mould, the speed of rotation of the mould being such that the resin is forced against said inner wall to form a hollow cylinder consisting solely of fluid resin and of substantially uniform thickness, introducing a continuous filament of fibrous reinforcing material, which has a specific gravity higher than that of the resin, by means of a movable feed member adapted for reciprocatory longitudinal movement inside the mould, bringing said continuous filament into contact with said hollow cylinder of fluid resin, allowing said hollow cylinder fluid resin to take up said continuous filament from the feed member while moving said feed member longitudinally within the mould thereby forming a fibrous mat of braided structure within the resin, and curing the resin in said mold while continuing rotation of the mould.

2. The method according to claim 1 wherein the fibrous reinforcing material is glass fibre.

3. The method according to claim 1 wherein a supplementary reinforcement consisting of staple fibres is also introduced into the resin.

References Cited in the file of this patent

UNITED STATES PATENTS

| | | |
|---|---|---|
| 2,614,058 | Francis | Oct. 14, 1952 |
| 2,785,442 | Boggs | Mar. 19, 1957 |
| 2,870,054 | Amos et al. | Jan. 20, 1959 |
| 3,012,922 | Wiltshire | Dec. 21, 1961 |